United States Patent [19]
Weng

[11] Patent Number: 5,647,366
[45] Date of Patent: Jul. 15, 1997

[54] METHOD AND SYSTEM FOR AUTOMATIC MEASUREMENTS OF DOPPLER WAVEFORMS

[75] Inventor: Lee Weng, Issaquah, Wash.

[73] Assignee: Siemens Medical Systems, Inc., Iselin, N.J.

[21] Appl. No.: 718,060

[22] Filed: Sep. 17, 1996

[51] Int. Cl.$^6$ .................................................. A61B 8/00
[52] U.S. Cl. ............................. 128/661.09; 128/661.08
[58] Field of Search ......................... 128/661.08, 661.09

[56] References Cited

U.S. PATENT DOCUMENTS 5,271,404  12/1993  Corl et al. ........................... 128/661.08
5,287,753  2/1994  Routh et al. ........................... 73/861.25

OTHER PUBLICATIONS

Larry Y.L. Mo et al., "Comparison of Four Digital Maximum Frequency Estimators for Doppler Ultrasound," *Ultrasound in Med. & Biol.*, vol. 14, No. 5, pp. 355–363, 1988.

Primary Examiner—Francis Jaworski
Assistant Examiner—Derrick Fields

[57] ABSTRACT

A method and system of processing Doppler data includes determining a noise component independently of automatic signal analysis. A succession of frequency spectra is formed in response to receiving reflected energy from an object of interest. A Doppler waveform is then derived from the succession of frequency spectra. The execution of noise estimation is limited to time periods between peaks of the Doppler waveform, providing a first level of isolation from the true-signal processing. Implementation of the noise estimation is based upon portions of the frequency spectra that are independent of the portions from which the Doppler waveform is derived. This provides a second level of isolation. The determined noise component is used as a threshold level in subsequent derivation of the Doppler waveform. Preferably, there are multiple noise thresholds that are adaptively utilized to permit application of a short search block during Doppler frequency detection.

19 Claims, 6 Drawing Sheets

METHOD AND SYSTEM FOR AUTOMATIC MEASUREMENTS OF DOPPLER WAVEFORMS

TECHNICAL FIELD

The invention relates generally to Doppler spectrum analysis and more particularly to methods and systems for automatically generating Doppler-derived waveforms.

BACKGROUND ART

Doppler spectrum analysis is used in a wide variety of applications, such as ultrasound clinical diagnoses. Ultrasound Doppler-derived waveforms provide important diagnostic information regarding examined blood flow. Perhaps the two most commonly used waveforms are maximum frequency and mean frequency waveforms. From these derived waveforms, other Doppler measurement parameters and indices, such as the pulsatility index and the resistance index, can be further derived. However, accurate and robust measurement of the derived waveforms is a crucial task for the performance of a diagnostic ultra-sound imaging system.

In operation, an ultrasound transducer is brought into contact with a person and is positioned to propagate ultrasound energy into the body and receive reflected energy from an object of interest. For example, the energy may be directed at vessel lumen.

The ultrasound energy that is received by the transducer is used to generate a succession of frequency spectra. The received energy has a range of frequency components. Each frequency spectrum represents the intensity values for the frequency components during a particular time. The intensity values of a frequency spectrum are referred to as "frequency bins." A single frequency spectrum may be formed of 256 frequency bins.

Ultrasound Doppler-derived waveforms are then formed from the generated frequency spectra. A maximum frequency waveform defines the peak blood speed. For arterial flow, the speed of blood flow increases during the systolic phase of the heart cycle and declines during the diastolic phase. A conventional approach of deriving the maximum frequency waveform or other second-generation Doppler signals is to freeze images of the frequency spectra and manually determine relevant values. For example, the user may move a track ball to trace the outer edge of a spectrum. This is a time consuming and labor intensive process. Moreover, the accuracy of the process relies upon the skills of the user. Manual measurement may not provide accurate results over time. Besides accuracy, an important requirement is measurement robustness. In the clinical environment, the measurement must be performed consistently in normal and low signal-to-noise ratio conditions and should perform consistently for different users and different system settings Automated methods of deriving Doppler waveforms are known. In order to generate accurate and robust Doppler-derived waveforms, there must be a separation between the Doppler spectral signal and any background noise. In one approach, the noise threshold is defined as a percentage of the average of noise and signal in a chosen processing domain. This percentage is a fixed number for all patients. Since a noise level relative to the signal level can change dramatically from patient to patient, the noise threshold floats depending upon the patient. In this approach, the noise level selection and waveform detection are subject to the signal strength. When the signal-to-noise ratio (SNR) is low, the fixed percentage will set the noise threshold below the actual noise level. The result is noisy derived waveforms. On the other hand, when the SNR is high, the fixed percentage sets the noise threshold above the actual noise level. Potentially, this results in missing weak signals in the systolic peaks. A second concern with this approach is that the average of the noise and signal can change dramatically from one frequency spectrum ("column") to the next, so that the noise threshold changes dramatically with time. While background noise does change with time, the actual noise level is relatively stable. As a result, this automated approach introduces a level of unpredictability.

U.S. Pat. No. 5,287,753 to Routh et al. describes an automated technique for continuously determining and displaying the peak and mean velocities of spectral Doppler information. To distinguish the signal from the noise, a number of spectral lines are selected from a single cardiac cycle. For each selected line, a peak intensity is determined. Then, an assumed noise threshold (e.g., 3 dB below the peak frequency) is applied. The average of the data points above the noise threshold and the average of the data points below the threshold are calculated. After the above-threshold average and the below-threshold average are determined for all of the selected lines, the separate averages are averaged for all of the lines. It is then assumed that the above-threshold average is the value of average signal and the below-threshold average is the value of average noise. The SNR is calculated by dividing the average signal value by the average noise value and by a constant (K) that is a function of the display rate of the spectral lines. The calculation of SNR is updated for each subsequent cardiac cycle.

One concern with the Routh et al. approach is that the selection of the assumed noise threshold (e.g., 3 dB below the peak intensity) is somewhat arbitrary. In a high SNR environment, a portion of the signal is likely to be included in the calculation of the average noise value. On the other hand, in a low SNR environment, part of the noise may be included in the determination of the average signal value. Noise threshold derived from the average SNR is still subject to the change in signal strength. An inaccurate noise threshold makes maximum frequency detection less robust. The derived waveform can be noisy when the threshold is low. The systolic peak can be missed when the noise threshold is improperly set high.

Another automated approach is described in U.S. Pat. No. 5,271,404 to Corl et al. The calculation of the SNR begins with determining a region of lowest spectral amplitude in a region of highest spectral amplitude for each frequency spectrum. For example, in a frequency spectrum consisting of 256 bins, the bins may be divided into bands and the value of each bin within a band may be summed with the values of the other bins within the band. The accumulated value for a band is compared to the accumulated values of other bands within the same spectrum to find the highest value band and the lowest value band. After the two bands are found for the various frequency spectra, the corresponding values for the bands are incorporated into a running weighted average value for the highest value bands and a second running weighted average value for the lowest value bands. The weighting factor is selected to determine how many of the most recent frequency spectra contribute significantly to the average values. The ratio of the two average values is then identified as the SNR. A concern is that the selection of only the highest value bands and only the lowest value bands does not provide a sufficient sampling for determining an accurate SNR.

After the SNR is selected using one of the above approaches or using a different approach, the maximum Doppler frequency waveform is derived. This may be achieved by defining a search block of contiguous bins. The location of the maximum Doppler frequency may be identified as the value of the first bin after which all of the bins in the search block have an intensity value greater than the noise threshold. For example, the search block may comprise ten bins. There are two potential problems with this design. First, the noise threshold must be sufficiently high to prevent long noise from being detected as the beginning of the Doppler signal. This high noise threshold may chop off systolic peaks. Second, there is a tradeoff within the selection of bins in the search block. The search block should be sufficiently long to avoid interpreting a small noise spike as Doppler signal, but should be sufficiently short to avoid missing narrow spectrum, such as from femoral arteries.

Yet another problem in automatic Doppler waveform measurements relates to signal crossover. The selection of a domain for maximum Doppler frequency detection is defined to a side of a baseline which has a higher signal energy. This definition operates well as long as the energy difference between the upper and lower sides of the baseline is large. However, in bi-directional flow, the reversals of flow direction can generate Doppler signals on both sides of the baseline with comparable energy. The manner of managing trace crossover is somewhat problematic. Higher energy definition can become unstable and cause the waveform trace to suddenly cross the baseline. This sudden crossing may occur more than once if energy detection is within a noisy environment. The sudden jumps produce bends within the waveform and make the appearance of the waveform less desirable.

What is needed is a method and system for processing Doppler data in an automated manner and with high degrees of accuracy and reliability within a range of different environments.

SUMMARY OF THE INVENTION

A method and system of processing Doppler data includes determining a noise component independently of automatic signal analysis. A succession of first Doppler signals, typically frequency spectra, is formed in response to reflected energy from an object of interest. A second Doppler signal, typically a Doppler waveform, is derived from the succession of first Doppler signals. The implementation of the noise estimation is limited to time periods between peaks of the Doppler waveform, providing the first level of isolation from the true-signal processing. Moreover, the implementation of the noise estimation is based upon portions of the first Doppler signals that are independent of those portions from which the Doppler waveform is derived. This provides a second level of signal-noise isolation. In the preferred embodiment, the noise estimation effectively defines a third portion of each frequency spectra, with the third portion spacing the noise-estimation portion from the waveform-determinant portion.

Within medical applications, a noise estimation window is defined between two cardiac cycles. For a maximum Doppler frequency waveform, the upper bound of the noise estimation window should be within the range of possible frequencies and sufficiently far from the maximum possible frequency to avoid including any small aliasing into the estimation window. The lower bound should be sufficiently far from the baseline of the waveform to avoid including any low Doppler signals in the window, i.e., to ensure that the derived waveform does not enter the noise estimation window. The left and right bounds are dynamically defined by the detected maximum Doppler frequency. If the maximum frequency does approach the noise estimation window, such as during systole, the noise estimator is automatically and temporarily disabled. For each frequency spectrum, a maximum noise value within the noise-estimation portion of the spectrum is determined. A mean noise ceiling is then calculated, with the ceiling being adaptive in order to track changes in noise over time.

The mean noise ceiling provides a first threshold for deriving values of the maximum Doppler frequency waveform from frequency spectra. In the preferred embodiment, a small search block is utilized and the frequency bins within the search block are considered within first and second groups. For example, a frequency spectrum may include 256 frequency bins and the search block may be limited to four bins, with two bins in each of two groups. However, the number of bins in a group is not critical to the invention. For a position of the search block, the bins in the first group are compared to the first threshold defined by the mean noise ceiling. If all of the bins exceed the first threshold, a determination is made as to whether the average of the bins of the second group is greater than the sum of a function of the mean noise ceiling and the mean of the bins of the first group. This sum provides a second threshold. If the second threshold is exceeded by the greatest value of the bins of the second group, the location of the first bin is defined as the maximum Doppler frequency. Optionally, if it is known that the signal environment is a high noise environment, the implementation may be made more robust by increasing both of the thresholds and by increasing the difference between the two thresholds.

In another optional embodiment, there is a conditional noise level adjustment in addition to the two adaptive thresholds. Within clinical diagnosis, the peaks of the maximum Doppler frequency waveform are more important than other portions of the waveform. It is beneficial to set the noise thresholds sufficiently low to accurately capture fine systolic peaks. However, a higher threshold at areas removed from systolic peaks provides increased robustness. Thus, the noise thresholds may be changed somewhat from the peak systole to rest portions of the cardiac cycle. The increase may be implemented in direct proportion to the distance between a peak level and the previously detected maximum frequency level.

The method and system preferably include conditional median filtering. A concern with using a median filter is that conventional techniques may cause a systolic peak to be chopped. In the preferred embodiment, the conditional median filter applies a decaying filter level between successive peaks. Thus, the decaying filter level has a maximum at a peak value, but decreases immediately from the maximum, so that the next systolic peak exceeds the decayed filter level.

Also included within the preferred embodiment is an adaptive crossover estimator. A linear (first-order polynomial) least-mean-squared curve-fitting algorithm is applied to the maximum Doppler frequency waveform to smooth the waveform when crossing the baseline.

In addition to the maximum Doppler frequency waveform, a mean Doppler frequency waveform is preferably derived. This step may be performed by using only that data between the detected maximum and the baseline. When the maximum and mean waveforms are simultaneously displayed over a spectralgram, visually detecting the beginning of systole is not a difficult task. The beginning of systole is the point at which the left ventricle begins to eject blood into the aorta. A sharp systolic velocity rise is easy to detect in the beginning of systole as the location of the waveforms slightly in front of the sharp rise. The difficulty is in providing an automated approach to detecting the beginning of systole. In the preferred embodiment, a straight line (least-mean-squared error curve-fitting) calculation is applied to the sharp rise of the maximum Doppler frequency waveform. By extrapolating, the straight line can be extended back in time to intersect with the mean Doppler frequency waveform. The beginning of a cardiac cycle can then be identified as the intersection of the straight line with the mean Doppler frequency waveform.

An advantage of the invention is that the adaptive signal processing significantly improves the quality of Doppler-derived waveforms in both high and low spectral SNR conditions. The measurement accuracy is preserved, so that maximum frequency in Doppler spectrum can be robustly tracked in both high and low blood flow areas. The mean Doppler frequency waveform is calculated after the true Doppler signal is separated from the background noise, so that the accuracy of the waveforms is improved.

BEST MODE FOR CARRYING OUT THE INVENTION

Figure 1:
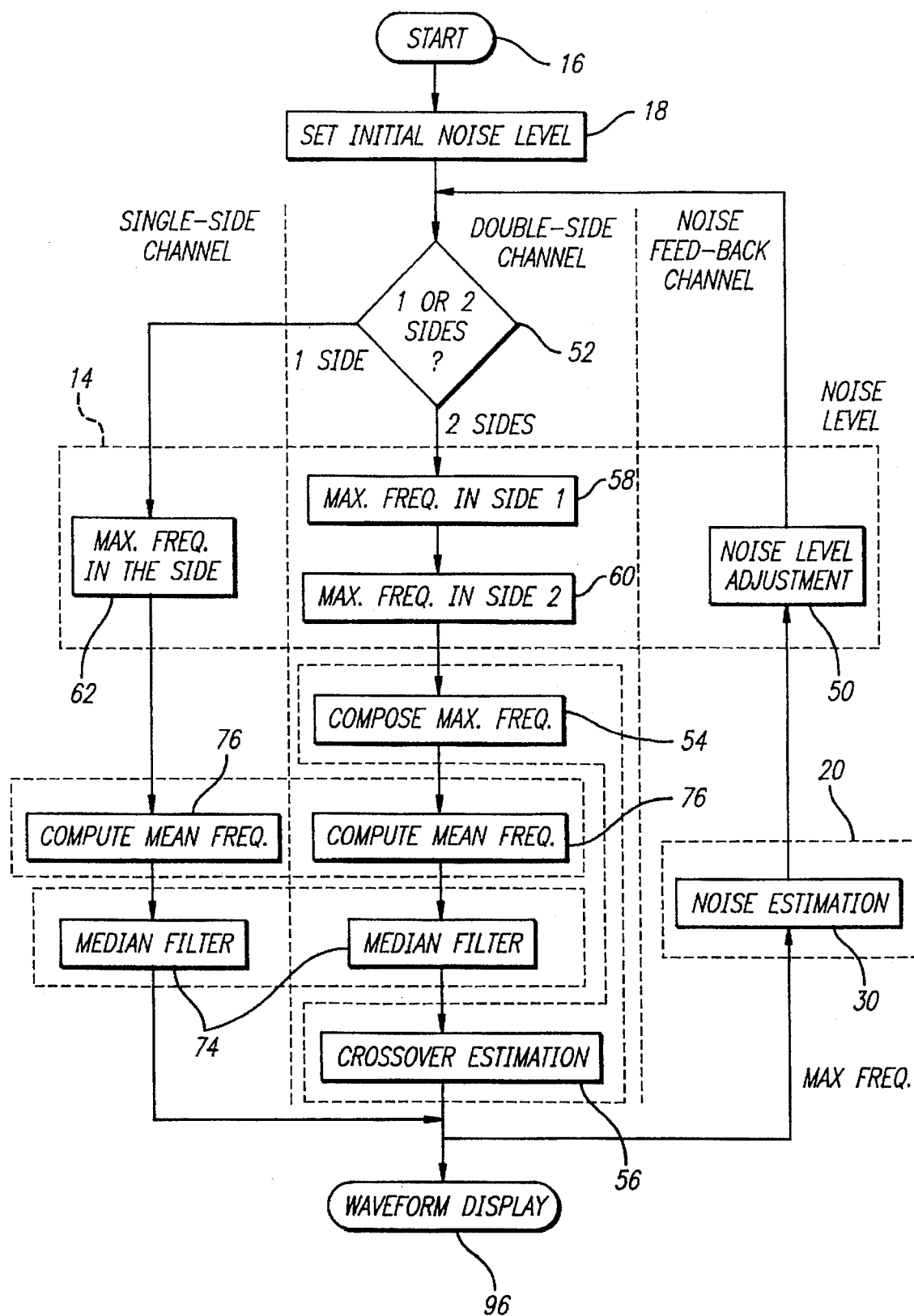
FIG. 1 is a hybrid system block diagram and process flow chart for automatic Doppler waveform measurements in accordance with the invention.
Figures 2, 8:
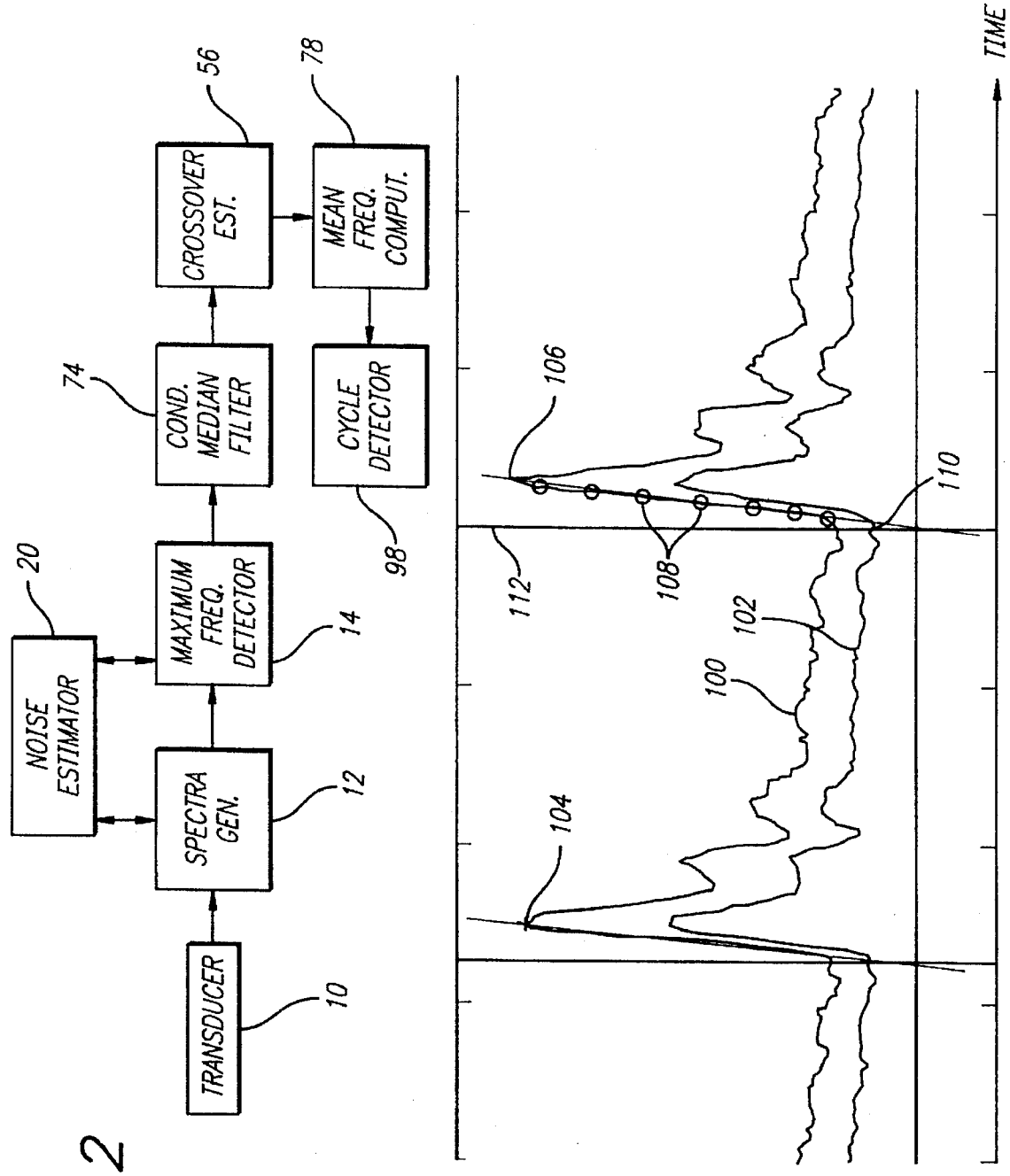
FIG. 2 is a block diagram of the system of FIG. 1.
FIG. 8 illustrates mean and maximum Doppler frequency waveforms and an application of a start-cycle detector of FIG. 2.

With reference to FIGS. 1 and 2, a conventional ultrasound transducer 10 is used to transmit ultrasonic energy and to receive reflected energy. For example, the energy may be directed at a blood vessel or the heart of a patient. The movement of red blood cells in the vessel or heart induces Doppler shifts that can be used for diagnostic purposes. Doppler-shifted ultrasound energy may be processed to form a blood velocity spectralgram for monitoring systolic and diastolic phases of a cardiac cycle.

The output of the ultrasound transducer 10 is received at a frequency spectra generator 12. As is well known in the art, the spectra generator converts the Doppler-shifted ultrasonic energy into Doppler signals that represent intensity values of frequency components. Each frequency spectrum is formed of a succession of frequency bins, with each bin being an intensity value for a particular frequency component. A single frequency spectrum may be formed of 256 frequency bins, but the number is not critical to the invention.

The frequency spectra generator 12 is formed of a number of different components. For example, the generator may include a sample-and-hold device for periodically capturing the ultrasound signal from the transducer 10 and may include a Fourier transform device that derives the frequency spectra from the sampled and held signal.

A maximum Doppler frequency detector 14 derives a waveform from the frequency spectra formed by the spectra generator 12. While the preferred embodiment is one in which the derived waveform is a maximum frequency waveform, the noise-estimation invention may be employed in other waveform-generating embodiments. The maximum frequency identifies the peak blood speed, as is well known in the art. For each frequency spectrum, a maximum Doppler frequency is selected for forming the waveform. However, accuracy requires an identification of the background noise level within the Doppler signal.

One characteristic of background noise is that the absolute level of the noise spectrum is substantially independent from the Doppler spectral signal strength, since the major portion of the background noise is generated from the instrumentation rather than from blood flow. Nevertheless, noise level relative to signal level (SNR) can change dramatically among different patients. A second characteristic of the noise level is that the signal level does vary between cardiac cycles, but the noise level is relatively stable for different signal strengths in a cardiac cycle. Consequently, a noise threshold should be relatively stable if waveform detection is to be robust and predictable.

At a start 16 of operation of the maximum Doppler frequency detector 14, an initial noise threshold is set 18. This initial noise level may be empirically determined, but is soon adjusted using the techniques to be described below. As an example, the initial noise level may be set at one percent of the maximum spectral data range of the system. As an alternative to the embodiment of FIG. 1, the initial setting may be an input of an initial maximum frequency. After a few iterations, the system would establish a noise level. One column of Doppler spectrum provides data for one iteration. Only one column of data is needed in the signal processing and noise feedback channels of FIGS. 1 and 2.

A noise feedback channel includes a noise estimator 20. The background noise is treated independently of the Doppler signal. A statistical measurement of the noise level is calculated within a relatively large window. The noise level is adaptively determined, but the adaptive circuitry is selected to inhibit large fluctuations in a small time period.

In order to accurately detect the maximum Doppler frequency, the maximum noise must be detected. That is, a ceiling is of interest, rather than an average or a mean value of noise. Conceptually, the background noise may be considered as small ripples on water having a floating light-weight board. The concern is how high the board is floating on top of the ripples. In the ideal "pond," the ripples are independent of larger tide waves. If the level of the ripples with the board is dynamically measured, detecting a point at which the board begins to float into a tide wave is simplified. The object of the maximum frequency detector 14 is to detect the beginning edge (maximum frequency) of the tide wave (individual frequency spectrum), since the height of the tide wave is not an issue. The function of the adaptive noise estimator 20 is to locate a tranquil area between tide waves in order to level-off the floating board.

Figure 3:
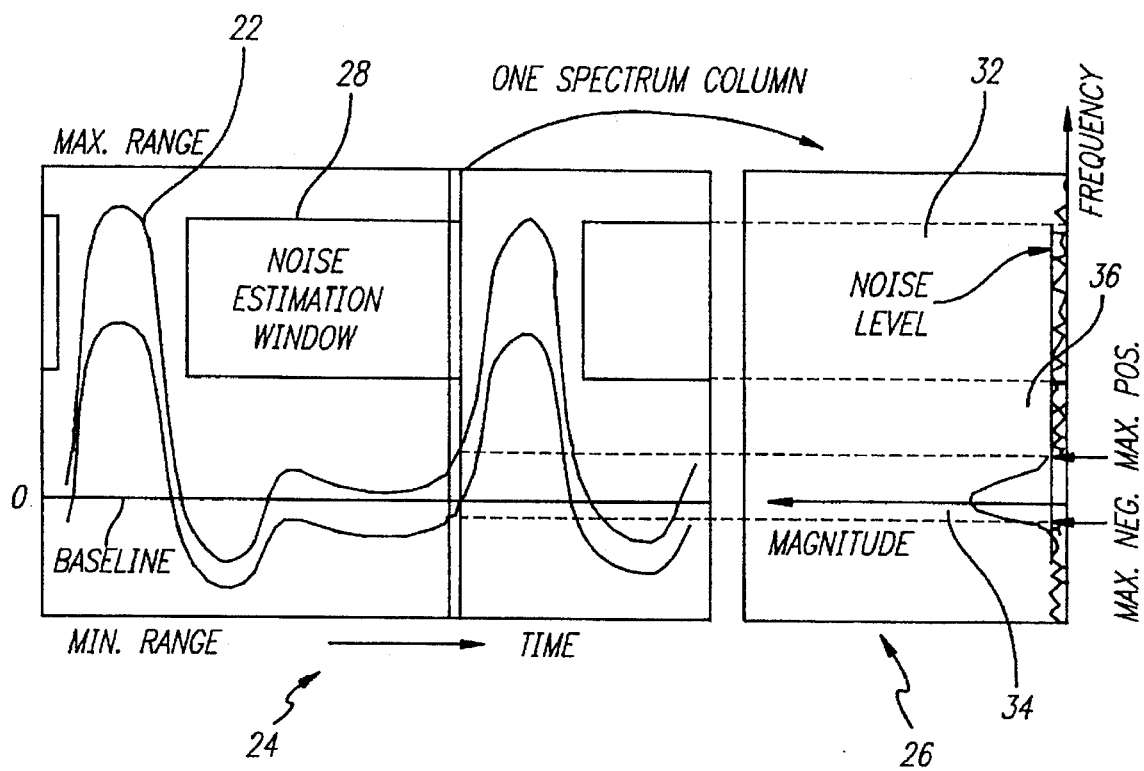
FIG. 3 is a data sequence representing a Doppler waveform, and includes one of the frequency spectra for determining the Doppler waveform.

Referring now to FIGS. 1, 2 and 3, a maximum Doppler frequency waveform 22 is shown at a left side 24 of FIG. 3.

As previously noted, the waveform 22 is formed of values selected from a succession of columns of frequency spectra. One frequency spectrum is shown at the right side 26 of FIG. 3. The frequency spectrum is a signal representative of intensity as a function of frequency, while the Doppler waveform 22 is representative of frequency as a function of time. Returning briefly to the conceptualization, the height of the board is calculated during a noise estimation window 28 between two tide waves of the Doppler waveform 22. That is, the implementation of the noise estimation step 30 of FIG. 1 is limited to time periods between peaks of the Doppler waveform. This provides a first level of isolation from true-signal processing. Moreover, the implementation of the noise estimation is based upon portions of the frequency spectra that are independent of those portions from which the Doppler waveform is derived. This provides a second level of signal-noise isolation. In the column 26 of FIG. 3, the noise is estimated during a first portion 32 indicated within dotted lines, while waveform values are derived from a second portion 34. In the preferred embodiment, there is a third signal portion 36 that separates the noise-estimation portion 32 from the waveform-determinant portion 34.

The upper bound of the noise estimation window 28 is sufficiently below the maximum Doppler range to avoid including any aliasing into the noise estimation window. The lower bound of the window is sufficiently above the baseline to avoid including any low Doppler signals into the window. The left and right bounds are dynamically defined by the detected maximum Doppler frequency waveform 22. If the maximum frequency waveform 22 is close to the lower bound, such as during systole, the noise estimation is temporarily shut down until the maximum waveform drops away from the lower bound.

For each column that intersects the noise estimation window 28, a maximum noise value within the noise-estimation portion 32 is detected. For column n, the maximum noise value, max_noise(n), is calculated. This calculation is repeated for each column and a mean noise ceiling established for operation of the system. In the preferred embodiment, the mean noise ceiling is:

noise_mean(n)=noise_factor*noise_mean(n−1)+noise_margin*(1−noise_factor)*max_noise(n), where noise_factor controls the noise adaptive speed, and noise_margin allows a small tolerance for error. In one embodiment, noise_factor=0.96 and noise_margin=1.05. During noise estimation shutdown, noise_mean is kept unchanged, until the noise estimation is resumed after the systolic peak.

Figure 4:
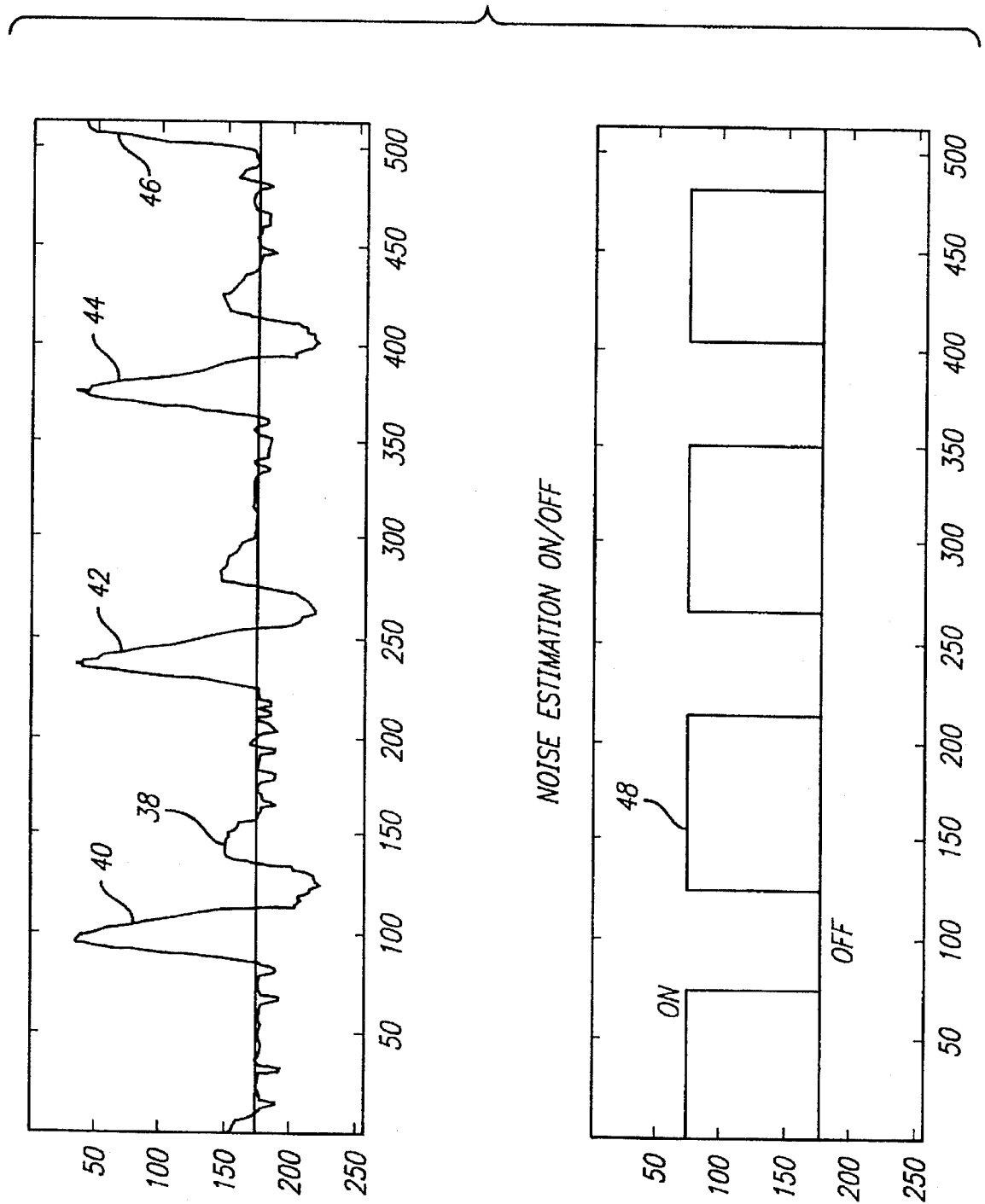
FIG. 4 illustrates a maximum Doppler frequency waveform and a control signal for a noise estimator of FIGS. 1 and 2.

Referring to FIGS. 2 and 4, a maximum Doppler frequency waveform 38 representing 512 columns is shown as having four systolic peaks 40, 42, 44 and 46. The figure also includes a control signal 48 for background noise estimation shutdown. The adaptive noise estimator 20 is temporarily disabled near each of the four systolic peaks. Consequently, the noise estimation is isolated from maximum frequency detection.

In FIG. 1, the average noise ceiling that is calculated at the noise estimator 20 is used to update the maximum Doppler frequency detector 14. That is, the noise level which was originally set at step 18 is adjusted at step 50 according to the calculation of the average noise ceiling. The adjusted noise level is then used for subsequent maximum Doppler frequency detection.

In step 52, a determination related to domain is executed. That is, it is determined whether one or both of the maximum frequencies above and below the baseline are to be detected by the maximum frequency detector 14. If only one of the maximums is of interest, the system uses the single-side channel of FIG. 1. On the other hand, if the two maximums are to be combined into a single waveform, the double-side channel of FIG. 1 is employed. The combination of the two maximums is shown in the waveform of FIG. 3. The combination of the maximums may take place within the maximum frequency detector 14, but in the embodiment of FIG. 1 the combination of the two maximums is provided in step 54 and is implemented within a crossover estimator 56. The operation of the crossover estimator will be described more fully below.

Returning to the conceptualization, the step 30 of estimating noise accurately identifies the mean ceiling level of the board floating at the ripple level. Within the double-side channel, the next steps are to identify the maximum positive frequency 58 and the maximum negative frequency 60. In the single-side channel, the maximum frequency detector includes a single step 62 of identifying the maximum frequency. In implementing a step 58, 60 and 62 for detecting maximum Doppler frequency, a search block is selected. The search block is identified by a limited number of bins, with the block shifting in order to shift the focus of search within a frequency spectrum. Using prior art techniques, if the search block had a long bin length, there is a potential of missing a narrow Doppler spectrum. On the other hand, if the length of the search block is minimized, noise spikes potentially could be interpreted as Doppler edges.

Figure 5:
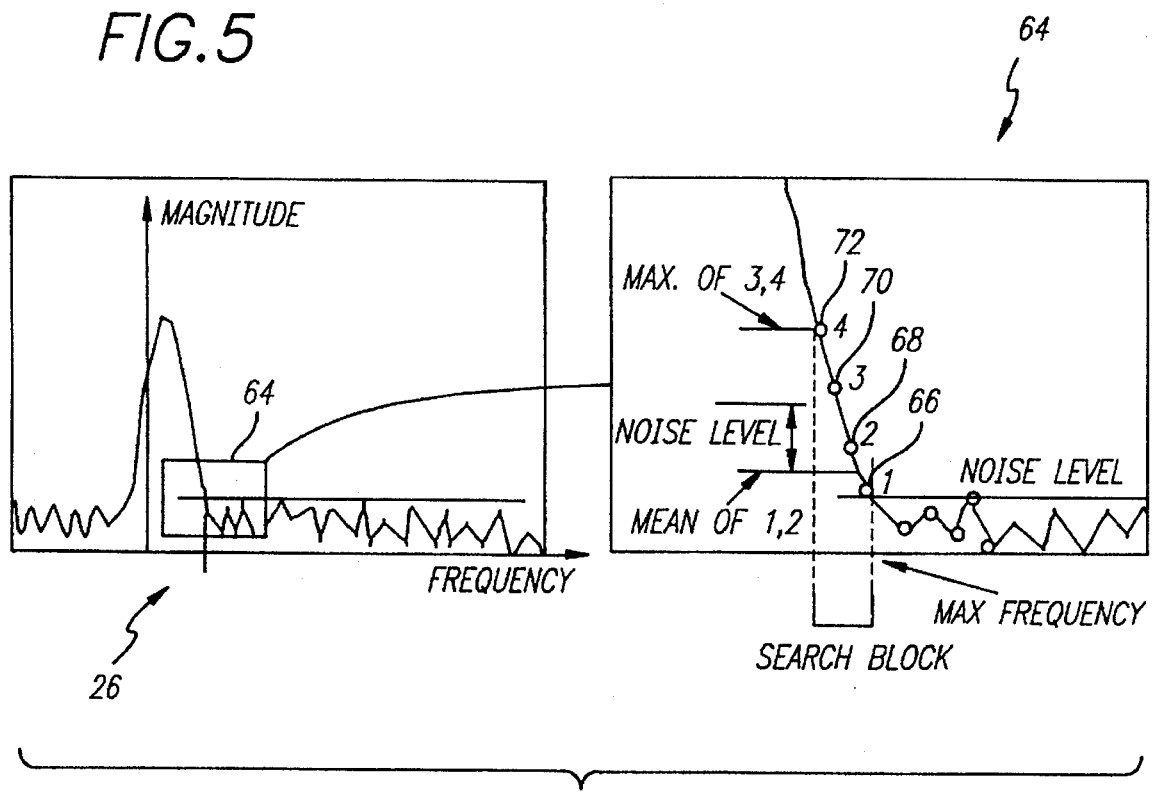
FIG. 5 illustrates the frequency spectrum of FIG. 3 and an expanded view of a region of the spectrum.

Referring now to FIGS. 3 and 5, the preferred embodiment has a search block of four bins. The frequency spectrum 26 of FIG. 3 has been rotated ninety degrees in FIG. 5. A limited region 64 is expanded to illustrate the operation of the search block. In order to determine the maximum positive frequency, the search is conducted from the right to the left of the data sequence. The search block is considered as having at least two groups of bins. While the number of bins in a group is not critical, the operation of the search will be described with reference to two groups, each having two bins. Firstly, it is determined whether the first bin 66 and the second bin 68 of the first group have intensity values greater than the previously defined noise level. Thus, the noise level acts as a first threshold. If the first and second bins both have values greater than the threshold, the next step is to determine whether the greater value of the third bin 70 and the fourth bin 72 of the second group exceeds a second threshold. The second threshold is the sum of a function of the first threshold and a calculated value between the intensities of the first and second bins. In the preferred embodiment, the calculated value is the mean value of the bins of the first group. If one or both of the third and fourth bins have a value greater than the second threshold, the first bin 66 is defined as the location of the maximum Doppler frequency. This frequency is used to form the maximum positive waveform portion of the waveform 22 of FIG. 3. Here, the second threshold includes the measured noise level, which is changing with the background noise. In high noise environments, both thresholds may be increased and the difference between the two thresholds may be increased, thereby improving the robustness of the system. However, this is not critical.

In addition to the two noise thresholds, which are adaptive to the background noise level, there is preferably a third adaptive mechanism. The third adaptive mechanism is a conditional noise level adjustment. In clinical diagnosis, the peaks of the maximum Doppler frequency waveform 22 are more important than other portions of the waveform. Noise thresholds should be sufficiently low to accurately capture fine systolic peaks. However, it is desirable to set the thresholds a little higher in other signal locations in order to make the detection more robust and less noisy. In the preferred embodiment, the noise thresholds change slightly from the peak systole to the rest portions of the cardiac cycle. In the region of the peak, the noise level measured by the adaptive noise estimator 20 is directly used as the first threshold. When the waveform 22 drops below the peak level, the first threshold is increased slightly and continues to increase to a maximum of 150 to 200 percent above the measured noise level. The increase is directly proportional to the distance between the peak level and the previous detected maximum frequency level. When the previous maximum level reaches the baseline, the increase reaches its maximum.

Figure 6:
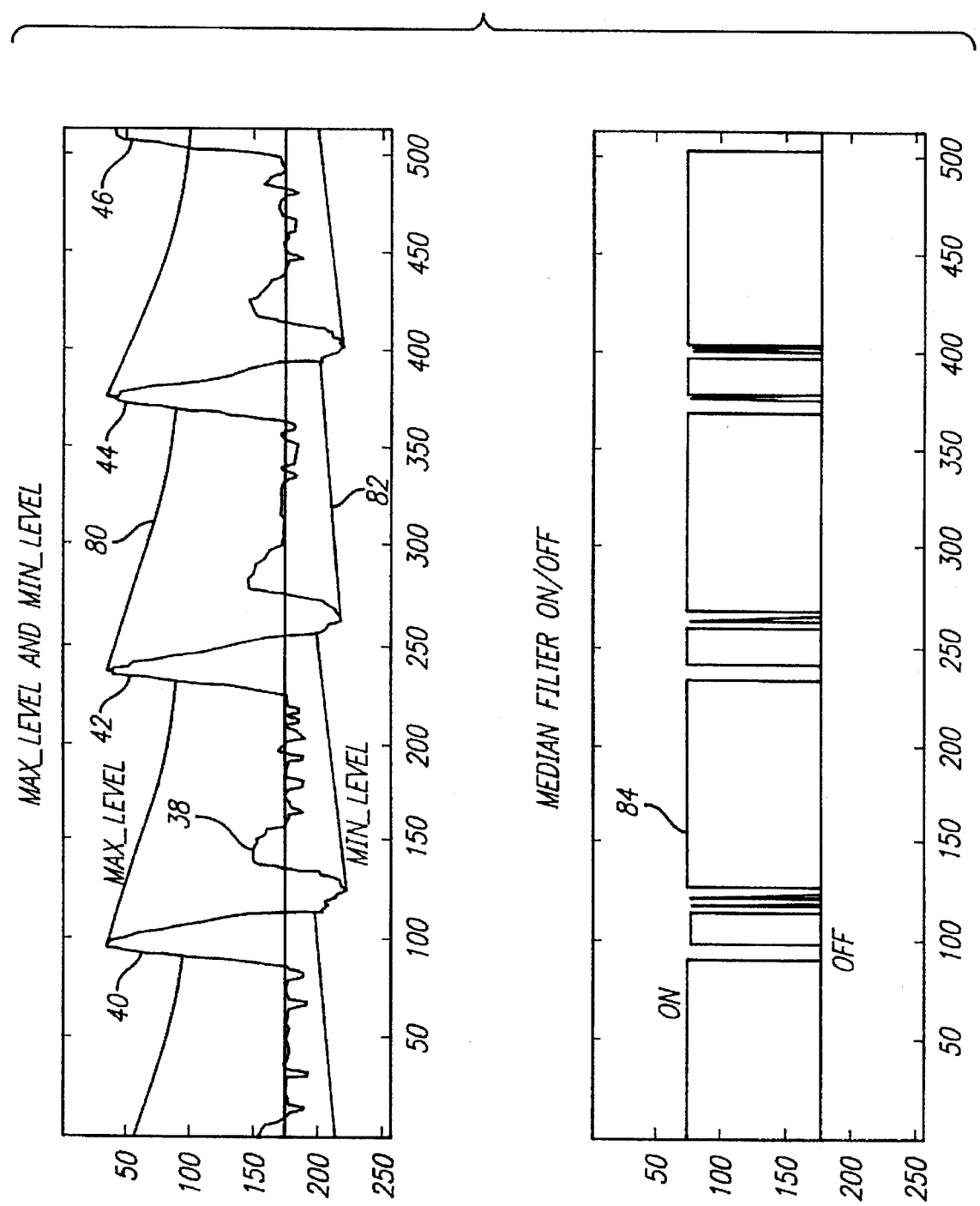
FIG. 6 illustrates a median filtered maximum Doppler frequency waveform and a control signal for the median filter of FIGS. 1 and 2.

Returning again to FIGS. 1 and 2, the preferred embodiment includes a conditional median filter 74. The conditional median filter is used to remove noise spikes from the derived waveform. As shown in FIG. 1, the median filter 74 is positioned after a step 76 of computing a mean frequency in either the single-side or double-side channels. This is the preferred embodiment. Nevertheless, the mean frequency computing device 78 may be located after the median filter, as shown in FIG. 2. The goal of the conditional median filter is to remove noise spikes without also removing systolic peaks. This may be done by disabling the median filter automatically during the systolic peaks. This requires prediction of peak positions. Such predictions may be based upon the period of the cardiac cycle, but cardiac cycles are often irregular, even for a healthy person. Another approach is to create a parameter referred to as max_level, which is defined as:

$$\text{max\_level}(n) = \max(\text{max\_temp}(n), \text{max\_level}(n-1))$$

$$\text{max\_level}(n) = \text{factor} * \text{max\_level}(n),$$

where max_temp(n) is the pro-filtered maximum waveform and factor is a decay factor that controls the decaying speed of max_level. An acceptable decay factor is 0.995. Whenever the pre-filtered waveform goes above the present value of max_level, the value of max_level increases. At all other times, the max_level value decreases slowly. This is shown in FIG. 6. The maximum Doppler frequency waveform 38 is filtered to provide periodic max_level decay 80 and min_level 82. After a systolic peak 40, 42, 44 and 46, the pre-filtered maximum waveform drops below the max_level value and the decay occurs. When the next systolic peak arrives, the value of max_level is less than the value of the new systolic peak. Consequently, the median filter is disabled, as shown by the control signal 84 in FIG. 6. When the pre-filtered maximum wave-form drops below max_level, the median filter is again switched "on." Consequently, the systolic peaks are not filtered. As shown in FIG. 6, the control signal 84 disables the conditional median filter for peaks at both sides of the baseline.

Returning to FIGS. 1 and 2, the crossover estimator 56 is also adaptive. The function of the crossover estimator is to provide a smooth transition from a positive peak to a negative peak of a waveform. Many conventional techniques of forming the maximum Doppler frequency waveform generate kinks near the baseline, causing the waveform to lose its original meaning of being a positive or negative maximum frequency. A kink of the waveform near the baseline does not have any clinical meaning.

Figure 7:
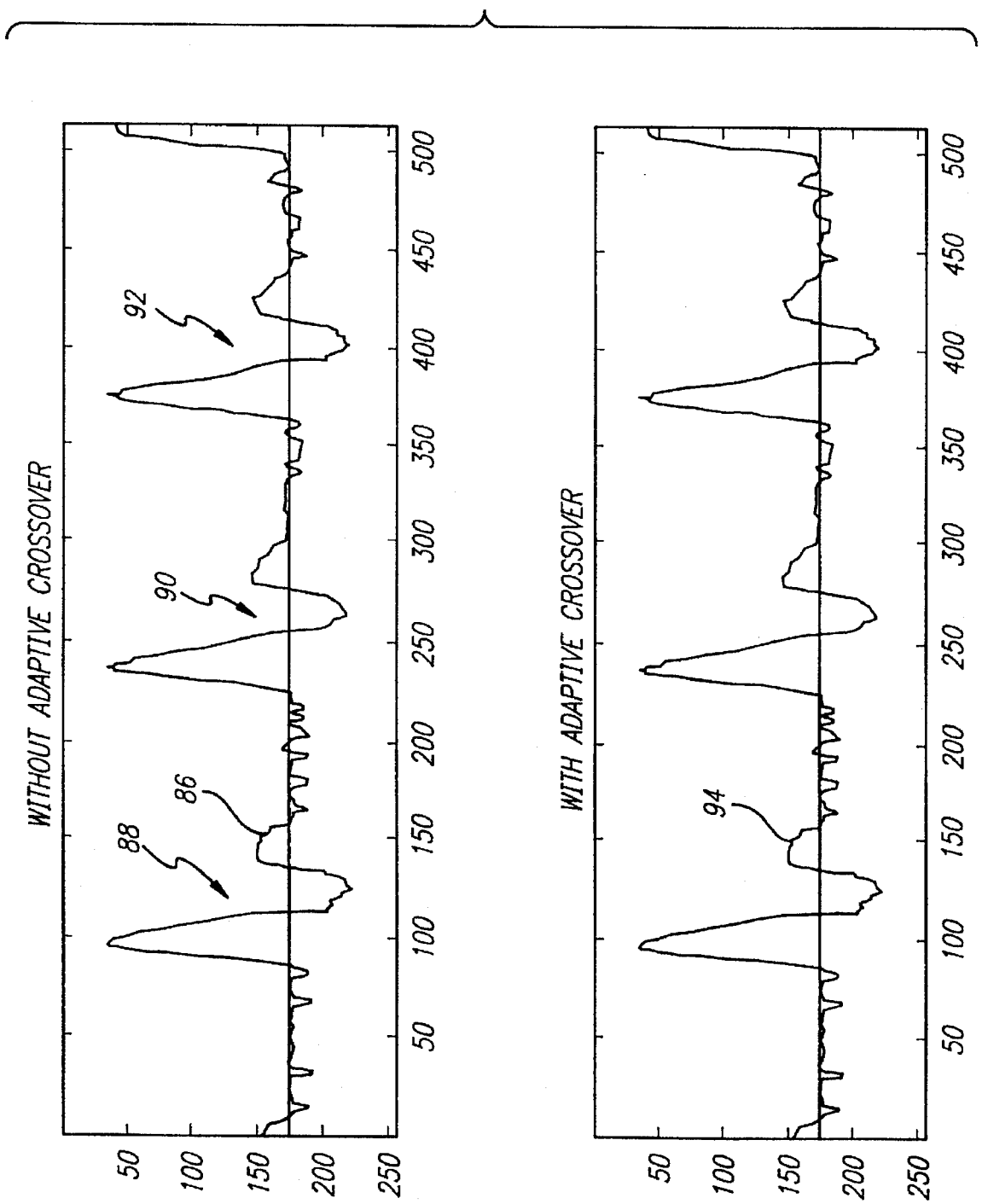
FIG. 7 illustrates a maximum Doppler frequency waveform both prior to input to crossover estimation and subsequent to processing by the crossover estimator of FIGS. 1 and 2.

As shown in FIG. 7, the most severe crossover problem occurs near the baseline when the waveform 86 moves from its positive peak to its negative peak. Ideally, the movement is fast, sharp and straight. However, spectral broadening may generate kinks 88, 90 and 92. By providing a crossover estimator to sustain the fast drop through the baseline, the crossover problem is solved. In the preferred embodiment, the crossover estimator is a linear (first-order polynomial) least-mean-squared curve-fitting algorithm that is applied to the data points behind positive peaks and before negative peaks. Linear curve-fitting does not introduce phase lagging if the underlying data is a straight slope. For the n'th data point on the maximum frequency waveform 86, the data point is replaced by the linear regression estimation value computed from the (n-fit_length+1)'th to the n'th data point. The length of the fitting (fit_length) varies. Near the positive and negative, the waveform curvature causes the fitting length to be as short as two data points. On the other hand, near the baseline, the fit_length has been experimentally shown to be as long as twenty data points. This significantly increases the linearity of the resulting waveform, as shown by the modified waveform 94 of FIG. 7. The fitting length is adaptively changed based on the relative distance (to the positive peak or the negative peak) of the current maximum frequency point from the baseline.

When implementing the curve-fitting into the system, it is not necessary to compute the regression coefficients in real time. Since this is a first-order least-mean-squared fitting, all regression coefficients for different fitting lengths can be pre-computed and stored in a look-up table. However, the maximum fitting length should be proportionally changed when spectrum display speed is changed. When the display scrolling rate is increased the length should be increased, while a decrease in the display scrolling rate should result in a decrease in maximum fitting length.

The mean frequency computing device 78 of FIGS. 1 and 2 may be used to form a mean frequency waveform after the maximum frequency waveform has been obtained. For the single-side channel, only the data points between the detected maximum and the baseline are used to compute the mean. For the double-side channel, data points between the maximum in the positive side and the maximum in the negative side are employed in the computation. In this manner, the influence of background noise outside of the spectrum is reduced, so that any mean frequency bias is reduced.

The resulting waveforms may be displayed on a monitor 96 or may be printed out, as is well known in the art. Moreover, the maximum and mean frequency waveforms are often used to determine Doppler flow indices such as a pulsatility index or a resistance index. The flow indices allow evaluation of a patient hemodynamic and pathological conditions. The evaluation requires the identification of the beginning of systole and the end of diastole of a measured cardiac cycle. Visually detecting the beginning of systole is a relatively easy task, since the sharp systolic velocity rise is easy to identify and the beginning of systole is slightly in front of the sharp rise. However, automated identification is more problematic. The bending sharpness of the systolic velocity rise fluctuates from one cardiac cycle to the next. Thus, a gradient-variance based approach is vulnerable to the noise in the waveform. In the system of FIG. 2, a cycle-start detector 98 utilizes a straight-line approach to identifying the beginning of a cardiac cycle. Since the systolic velocity rise is sharp following an end of diastole flow, the sharp systolic rising phase of the maximum waveform is treated as a straight line that is extrapolated to diastole. The cross-point of the straight line with the mean waveform, where average diastolic flow is indicated, is the starting point of the systole. Referring now to FIG. 8, a maximum Doppler frequency waveform 100 is shown with a mean Doppler frequency waveform 102. The cycle-start detector locates the systolic peak 104 of a cardiac cycle of interest, as well as the systolic peak 106 of the next cardiac cycle. To determine the end of the selected cardiac cycle, the detector locates sample points 108 on the maximum waveform along the sharp rise of the next cardiac cycle. Then, the detector fits these points into a straight line error curve fitting, such as a least-mean-squared error curve fitting. The line is extended backward in time to detect the location 110 of the crossing of the straight line with the mean waveform 102. The beginning of the next cardiac cycle is identified as the cross point. A vertical line 112 can then be automatically generated to identify the end of the cardiac cycle that includes the peak 104. The beginning of that cardiac cycle is shown by vertical line 114, which was previously generated using the same approach as that of locating vertical line 112. That is, sample points along the sharp rise to peak 104 were detected and used to calculate a straight line error curve fitting (sloped line 116). The beginning of the cardiac cycle that includes peak 104 was then identified by the cross point 118 of the sloped line 116 and the mean waveform 102.

I claim:

1. A method of processing Doppler data comprising steps of:
   forming a plurality of first Doppler signals in response to receiving energy from an object of interest, said received energy having a range of frequency components, each first Doppler signal being indicative of intensities of frequency components;
   forming a second Doppler signal from said first Doppler signals such that said second Doppler signal is indicative of values of a time-varying parameter of interest, said second Doppler signal having a succession of first peaks; and
   determining a noise component within said second Doppler signal, including limiting implementation of said determination to time periods corresponding to regions between said first peaks of said second Doppler signal and including basing said determination upon first portions of said first Doppler signals independent of second portions upon which said values of said time-varying parameter are based.

2. The method of claim 1 wherein said step of forming first Doppler signals includes forming a succession of frequency spectra and wherein said step of forming said second Doppler signal includes forming a maximum Doppler frequency waveform representative of said succession of frequency spectra.

3. The method of claim 2 further comprising utilizing said determined noise component in said step of forming said maximum Doppler frequency waveform, including applying said determined noise component as a threshold level.

4. The method of claim 3 wherein said step of forming frequency spectra includes defining each frequency spectrum in accordance with intensities of successive frequency bins, said step of applying said determined noise component as a threshold level including determining whether successive frequency bins in a first group of bins have intensities greater than said threshold level.

5. The method of claim 4 wherein applying said determined noise component further includes determining whether successive frequency bins of a second group of bins adjacent to said first group of bins have a maximum intensity exceeding a function of said threshold level plus a selected intensity value within a range of intensities representative of said first group of bins.

6. The method of claim 5 wherein applying said determined noise component further includes temporarily increasing said threshold level following each first peak of said maximum Doppler frequency waveform.

7. The method of claim 1 further comprising a step of automatically detecting said first peaks of said second Doppler signal, including utilizing a conditional median filter having a decaying filter level between successive first peaks.

8. The method of claim 1 wherein said first peaks of said second Doppler signal are positive peaks and wherein said second Doppler signal further includes negative peaks on a side of a baseline opposite to said positive peaks, said method further comprising a step of applying a linear least-mean-squared curve-fitting algorithm to said second Doppler signal.

9. The method of claim 1 further comprising a step of directing ultrasonic energy into a body, said step of forming said first Doppler signals being in response to receiving reflected energy from blood.

10. The method of claim 9 further comprising forming a mean frequency waveform from said first Doppler signals, said second Doppler signal being a maximum frequency waveform, said method further comprising detecting beginnings of cardiac cycles, including applying a least-mean-squared curve-fitting algorithm to a rising edge of said maximum frequency waveform and detecting a crosspoint of said mean frequency waveform with extension of a substantially straight line defined by applying said algorithm.

11. A method of processing Doppler data for medical applications comprising steps of:
   forming a series of frequency spectra in response to receiving ultrasonic reflections from an object of interest, each frequency spectrum being a sequence of bins;
   determining a first noise threshold indicative of a background noise component of said frequency spectra; and
   forming a maximum Doppler frequency waveform based upon said frequency spectra, including searching each frequency spectrum for a maximum frequency utilizing a search block of first and second groups of a small number of bins and including utilizing said noise threshold for each application of said search block, wherein utilizing said noise threshold includes determining whether successive bins of said first group each have an intensity value exceeding said noise threshold and, if so, whether a maximum intensity value of successive bins of said second group exceeds a sum of a function of said noise threshold and a calculated intensity value within a range of said intensity values of said first group.

12. The method of claim 11 wherein said step of forming said maximum Doppler frequency waveform includes selecting a search block to include only four bins.

13. The method of claim 11 wherein said steps of determining said noise threshold and forming a maximum frequency waveform are executed using first and second portions of a plurality of said frequency waveform, respectively, said first and second portions being spaced apart by third portions such that said steps are executed substantially in isolation.

14. The method of claim 11 further comprising a step of automatically detecting peaks of said maximum Doppler frequency waveform, including utilizing a conditional median filter having a decaying filter level within regions between successive peaks.

15. The method of claim 11 further comprising a step of applying a linear least-mean-squared curve-fitting approach to said maximum Doppler frequency waveform to smooth transitions across a baseline.

16. A system for providing automatic Doppler data processing for medical applications comprising:

an ultrasound transducer;

spectra means for generating a series of frequency spectra in response to receiving ultrasound energy at said transducer, said spectra means having a first output of said frequency spectra, each frequency spectrum being indicative of intensities of frequency components of said received ultrasound energy;

waveform means connected to said first output for generating a Doppler waveform of values of a time-varying parameter of interest in response to said frequency spectra, said waveform means having a second output in which said Doppler waveform has a succession of first peaks; and noise estimator means connected to said second output for determining a noise level during periods between successive first peaks based upon first portions of said frequency spectra remote from second portions upon which said values of said Doppler waveform are based.

17. The system of claim 16 wherein said output of said waveform means is a maximum frequency waveform output representative of maximum frequency as a function of time.

18. The system of claim 16 further comprising a conditional median filter means connected to said second output for applying a decaying filter level to said Doppler waveform between successive first peaks.

19. The system of claim 16 wherein said noise estimator means has a third output connected to said waveform means for applying said determined noise level for selecting said values of said time-varying parameter.

* * * * *